United States Patent
Rybkin et al.

(10) Patent No.: US 8,379,119 B2
(45) Date of Patent: *Feb. 19, 2013

(54) DEVICE AND SYSTEM FOR RESTORING A MOTION-BLURRED IMAGE

(75) Inventors: Vladimir Rybkin, Moscow (RU); Sergey Fedorov, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,046

(22) Filed: Sep. 23, 2011

(65) Prior Publication Data

US 2012/0237135 A1 Sep. 20, 2012

Related U.S. Application Data

(63) Continuation-in-part of application No. 12/330,771, filed on Dec. 9, 2008, now Pat. No. 8,098,303.

(51) Int. Cl.
*H04N 5/217* (2011.01)
(52) U.S. Cl. .................................................. 348/241
(58) Field of Classification Search .......... 348/241; 382/255, 264
See application file for complete search history.

(56) References Cited

U.S. PATENT DOCUMENTS

| | | | |
|---|---|---|---|
| 6,859,564 B2 * | 2/2005 | Caron | 382/264 |
| 8,098,303 B2 * | 1/2012 | Rybkin et al. | 348/241 |
| 2001/0024534 A1 * | 9/2001 | Gregory et al. | 382/299 |
| 2003/0182246 A1 * | 9/2003 | Johnson et al. | 705/76 |
| 2007/0286514 A1 * | 12/2007 | Brown et al. | 382/254 |
| 2008/0012955 A1 * | 1/2008 | Johnson et al. | 348/222.1 |

* cited by examiner

*Primary Examiner* — James Hannett
(74) *Attorney, Agent, or Firm* — John C. Meline; LeighAnn Weiland

(57) ABSTRACT

Embodiments of the present invention disclose a method, device and system for restoring a motion-blurred image. The method comprises determining parameters for a one-dimensional Optical Transfer Function (OTF) for the motion-blurred image in Fourier space; determining a signal-to-noise ratio for the motion-blurred image in the Fourier space; and correcting for motion blur based on the parameters of the OTF. Determining the parameters comprises calculating a function $\Phi(p,q)$ which is based on the square of the modulus of the Fourier transform $|G(p,q)|^2$ of the motion-blurred image. The parameters include the absolute value of the one-dimensional OTF, and the phase and sign of the OTF.

12 Claims, 11 Drawing Sheets

Fig. 1

After considerable development of the case, the appellant and the State entered into plea bargain negotiations, and the negotiations resulted in a plea bargain agreement under which the appellant agreed to plead guilty to the charges of kidnaping and wanton endangerment, and the State agreed to drop the malicious wounding and domestic battery charges.

After the parties entered into the plea bargain agreement, the appellant actually entered guilty pleas to the kidnaping and wanton endangerment charges, as provided in the plea bargain agreement.

Prior to sentencing the appellant on the pleas, the Circuit Court of Kanawha County conducted a sentencing hearing at which Ms. Franks, the victim, in essence, pled with the court that the court impose a minimal sentence upon the appellant. She stated:

> I feel even though what he did to me was wrong, I'm over it, you know. It's been two and a half years. I've moved on with my life. I'm going to school. I've got kids to raise. This has been going on for far too long. He's learned his lesson. It's over. I'm not physically hurt by it still. Nothing mentally was wrong with me. My son is perfectly healthy. I mean, I could see if something was wrong with one of us physically to where I can't do anything or something was wrong with my son, to give him the type of sentencing that they want to give him but there's no point. I go to visit him, me and my children- . . . I go up to the jail. I have contact visits and regular visits. . . .

Fig. 2

DEVICE AND SYSTEM FOR RESTORING A MOTION-BLURRED IMAGE

CROSS-REFERENCE TO RELATED APPLICATIONS

For purposes of the USPTO extra-statutory requirements, the present application constitutes a continuation-in-part of U.S. patent application Ser. No. 12/330,771 that was filed on 9 Dec. 2008 now U.S. Pat. No. 8,098,303, which is currently, or is an application of which a currently application is entitled to the benefit of the filing date. The contents of application Ser. No. 12/330,771 are hereby incorporated by reference in so far as application Ser. No. 12/330,771 is not inconsistent with the disclosure herein.

FIELD

Embodiments of the present invention relate to Optical Character Recognition (OCR) I and particularly to a system and device for restoring a motion-blurred image.

BACKGROUND

Photographic (or other optically captured images) images may be blurred by relative motion between an imaging system or camera and an object of interest. An example of a motion-blurred image is illustrated in FIG. 1. Motion-blurred images commonly occur when the imaging system is in moving vehicles or held by a human hand. OCR of blurred text of blurred text may be inaccurate or in some cases may be impossible.

The methods used to restore such images typically involve convolving the real image with a point spread function (PSF):

$$g(x, y) = \sum_{k=1}^{K} \sum_{m=1}^{M} f(k, m) h(x - k, y - m) + n(x, y), \quad (1)$$

where
f(x,y) is the non-blurred image;
g(x,y) is the image obtained from the camera;
h(x,y) is the PSF;
n(x,y) is the noise; and
K and M is the size of the image in pixels.

In the case of a blurred image, the PSF is a function of one argument, i.e. $h(x,y) = h_{1D}(x \sin(\alpha) + y \cos(\alpha))$, where $\alpha$ is the angle of the blur.

In the Fourier space, the equation (1) becomes:

$$G(p, q) = F(p, q) H(p, q) + N(p, q), \quad (2)$$

where, for example, $$G(p, q) = \sum_{x=1}^{K} \sum_{y=1}^{M} e^{\frac{2\pi}{K} ipx + \frac{2\pi}{M} iqy} g(x, y)$$

and $$g(x, y) = \frac{1}{K \cdot M} \sum_{p=1}^{K} \sum_{q=1}^{M} e^{-\left(\frac{2\pi}{K} ipx + \frac{2\pi}{M} iqy\right)} G(p, q).$$

Since the function G(p,q) and the others are periodical G(p,q)=G(p-K, q)=G(p,q-M), it is assumed everywhere below that the p and q variables may have either positive or negative values.

H(p,q) is the Fourier transform of the PSF, often called optical transfer function (OTF). In the case of a blurred image, the OTF is a complex function of one argument $H(p, q) = H_{1D}(p \cdot \sin(\alpha + \pi/2) + q \cdot \cos(\alpha + \pi/2))$.

Also, the Wiener filter may be used to restore images:

$$\hat{F}(p, q) = \frac{H^*(p, q)}{|H(p, q)|^2 + \frac{|N(p, q)|^2}{|F(p, q)|^2}} G(p, q), \quad (3)$$

where
$\hat{F}(p,q)$ is the estimated function (which hopefully is close to F(p,q)) and
$H^*(p,q)$ is the complex conjugate of H(p,q).
This filter minimizes the root mean square deviation of the restored image from the real image $$\sum_{x,y} \left(\hat{f}(x, y) - f(x, y)\right)^2,$$

provided that the average noise value is 0.
Therefore, in order to restore a blurred image, one needs to know:
1. the OTF H(p,q), and
2. the signal-to-noise ratio in the impulse space $$\frac{|N(p, q)|^2}{|F(p, q)|^2}.$$

U.S. Pat. No. 6,470,097 Oct. 22, 2002 describes an iteration method for finding a non-blurred image. At each step of this method, total variation regularization is performed to minimize the energy function with the image blur. The type of distortion is set as a parameter and is predefined. The length of the blur and its direction are also predefined. Additionally, the image is restored from a sequence of images rather than from one blurred image.

U.S. Pat. No. 6,859,564 Feb. 22, 2005 describes a method where the OTF is determined from the scaled $\alpha$th power of the smoothed magnitude of the blurred image and noise.

Other methods for restoring blurred images are described, for example, in the review by D. Kundur and D. Hatzinakos, "Blind Image Deconvolution Revisited," *IEEE Signal Processing Magazine*, vol. 13, no. 6, pp. 61-63, November 1996, and in other sources.

SUMMARY

Embodiments of the present invention disclose a method and system for restoring a motion-blurred image. The method comprises determining parameters for a one-dimensional Optical Transfer Function (OTF) for the motion-blurred image in Fourier space; determining a signal-to-noise ratio for the motion-blurred image in the Fourier space; and correcting for motion blur based on the parameters of the OTF. Determining the parameters comprises calculating a function $\Phi(p,q)$ which is based on the square of the modulus of the Fourier transform $|G(p,q)|^2$ of the motion-blurred image. The parameters include the absolute value of the one-dimensional OTF, and the phase and sign of the OTF.

BRIEF DESCRIPTION OF THE DRAWINGS

FIG. 1 shows a motion-blurred image of text on a page.

FIG. 2 shows a restored image obtained from the motion-blurred image in FIG. 1 by applying the method for restoring motion-blurred images in accordance with an example embodiment.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method and system for restoring a motion-blurred image. Broadly, the method comprises determining parameters for a one-dimensional Optical Transfer Function (OTF) for the motion-blurred image in Fourier space; determining a signal-to-noise ratio for the motion-blurred image in the Fourier space; and correcting for motion blur based on the parameters of the OTF. The parameters include the absolute value of the one-dimensional OTF, and the phase and sign of the OTF. In one embodiment correcting for motion blur involves the uses of the Wiener filter.

Figure 1:
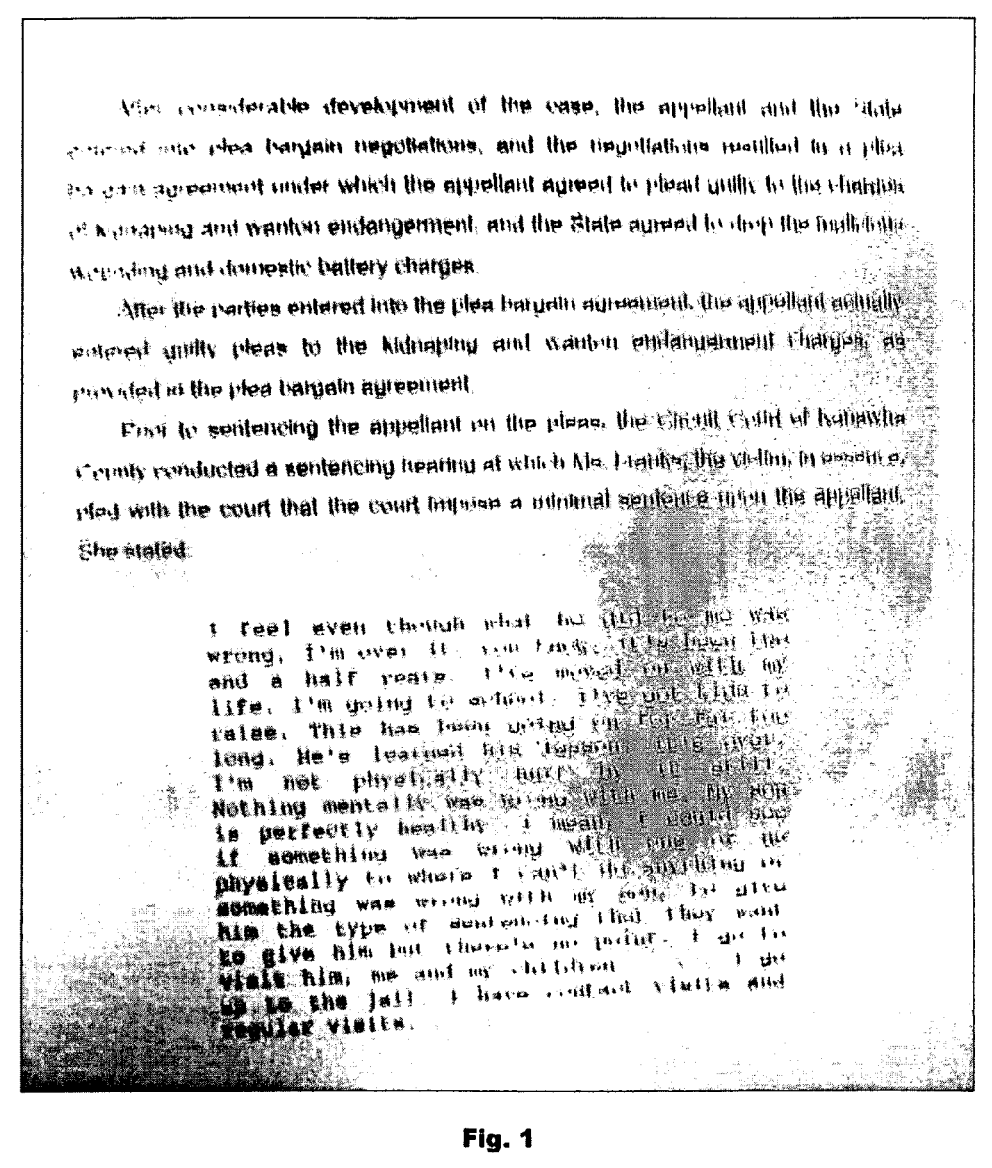
Figure 3:
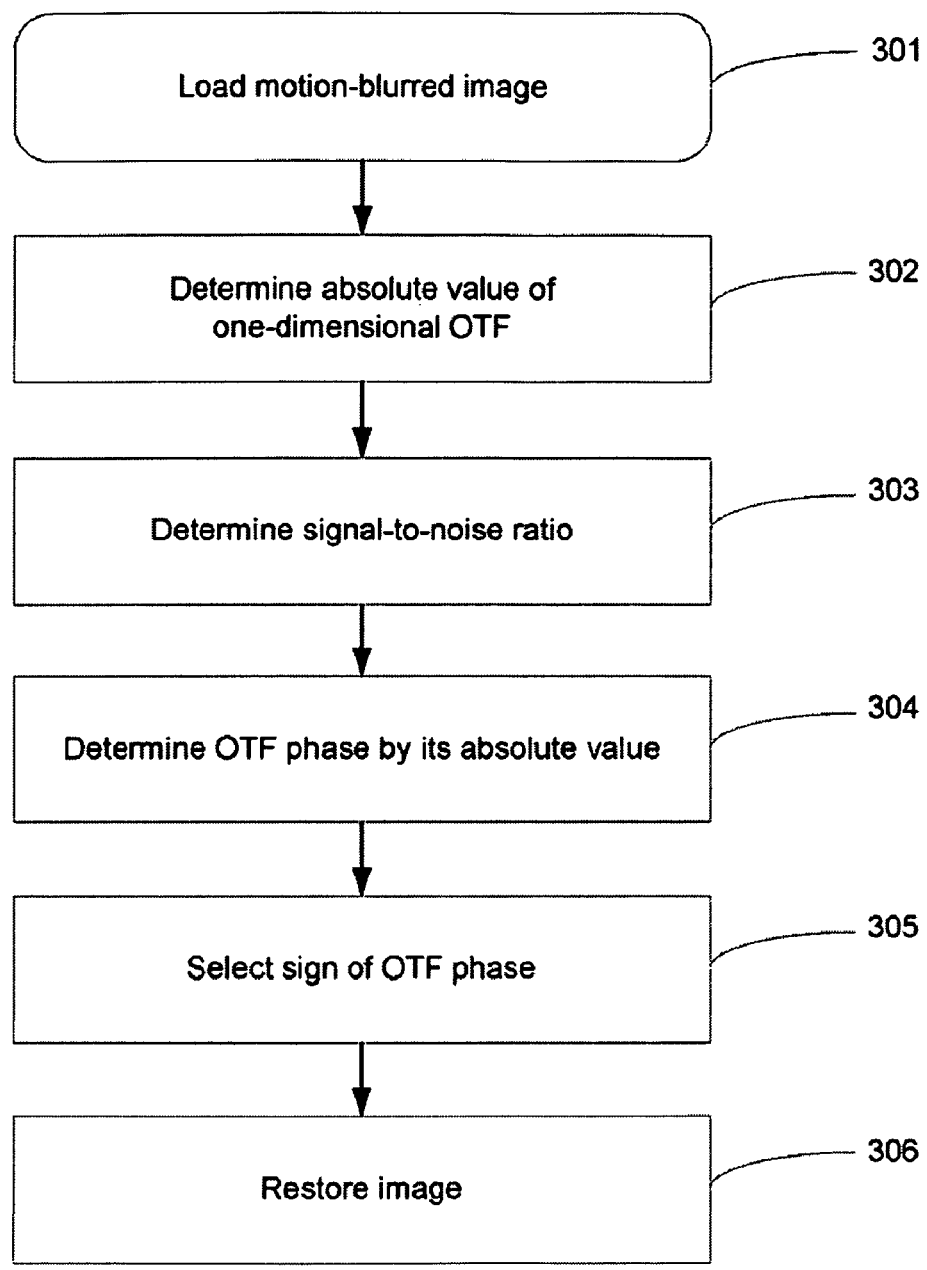
FIG. 3 shows a flowchart of the method for restoring motion-blurred images in accordance with an example embodiment.

FIG. 1 shows a motion-blurred image (referred to further simply as the image) which may, for example, have been obtained from a photographic camera. To restore this image, the method may include the following steps (refer to FIG. 3):

Load or acquire a motion-blurred image in need of restoration (301);

Finding the absolute value of the one-dimensional optical transfer function (OTF), which is the Fourier transform of PSF (302);

Determining the signal-to-noise ratio in the Fourier space (303);

Determining the phase of the one-dimensional OTF with corresponding accuracy (304);

Selecting the sign of the phase of the one-dimensional OTF (305).

Next, the image can be restored to obtain the image shown in FIG. 2, which can be successfully, at least more successfully, processed by an OCR application.

Figure 4:
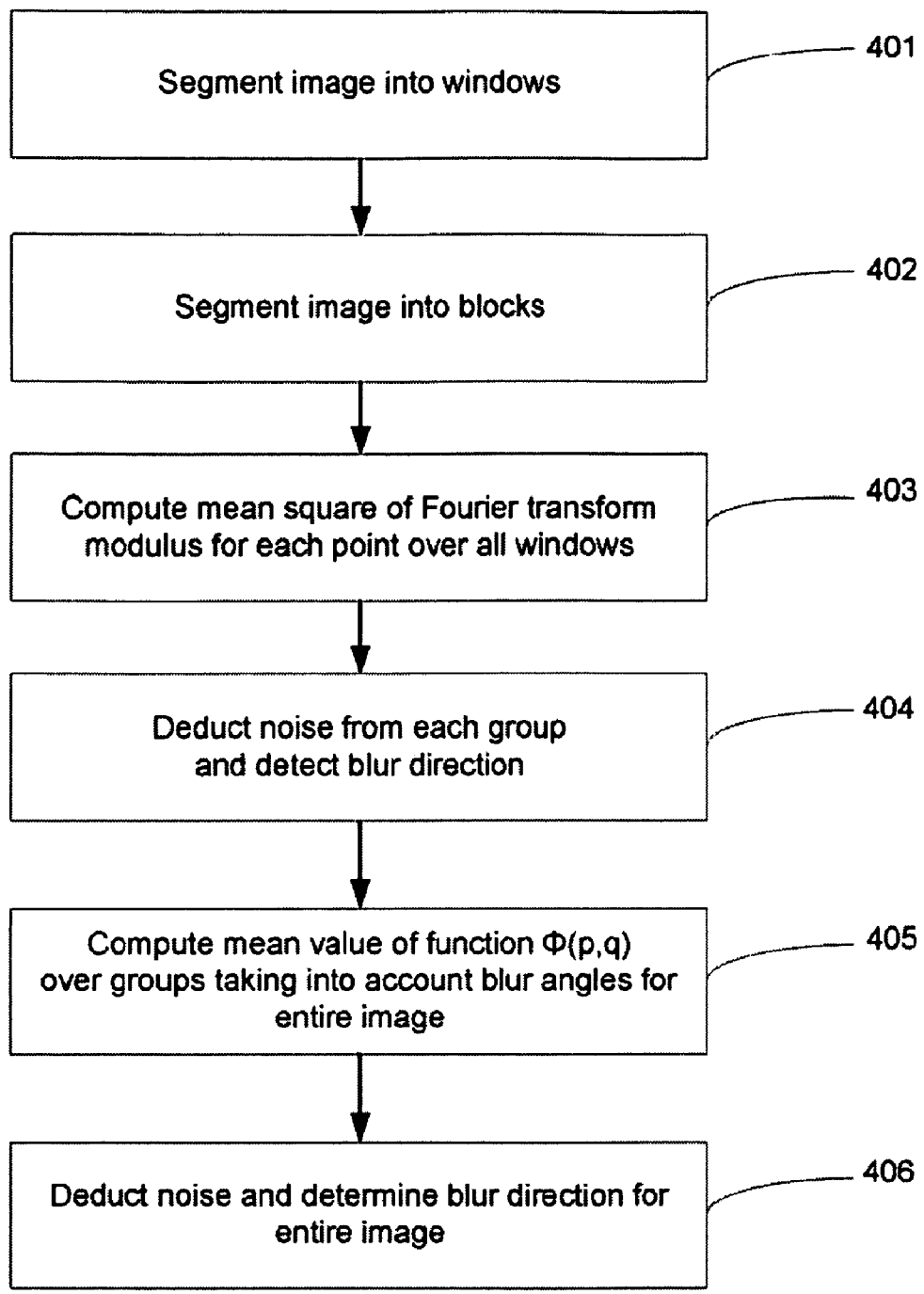
FIG. 4 shows the sequence of steps required to determine the OTF (302) and the signal-to-noise ratio (303) of FIG. 3.

To determine the OTF (302) and the signal-to-noise ratio (303), the steps shown in the flowchart in FIG. 4 may be performed. These steps are described below.

Segmenting the Image Into Windows (401)

If the image were not distorted by additive noise n(x,y), then, in accordance with equation (2), calculating the Fourier transform of the source image (function G(p,q)) would find the zeros of the OTF (function H(p,q)), and, if some additional assumptions are made, the absolute value of the function H(p,q). However, in reality, noise is an important factor which makes determining H(p,q) based on G(p,q) impossible. In different areas of the image, the function H(p,q) may be different (e.g. the direction of the blur may be different due to camera rotation at the moment of taking the picture).

To minimize the impact of the noise, the image is divided or segmented into windows, which are square areas of fixed dimensions. A window must be sufficiently large to include individual elements of the source image in their entirety (e.g. the height of the window must equal several rows of text) and sufficiently small to allow segmentation of the image into a considerable number of windows. In this embodiment of the invention, the size of the window is set to 256×256 pixels.

The image is segmented into windows in such a manner that the windows overlap at the edges. In each window, the components of each pixel are multiplied by the function of the window, which equals 1 in the middle of the window and gradually decrements to 0 towards its edges.

Segmenting the Image into Blocks (402) and Calculating the Mean Square of the Modulus of the Fourier Transform (403)

The windows are merged into blocks, the size of each block being approximately 5×5 windows. To determine the blur parameters, the function $\Phi_k(p,q)$ is defined, which is the square of the modulus of the Fourier transform, averaged over the windows and belonging to the kth block:

$$\Phi_k(p, q) = \sum_{i=1}^{A} |G_i(p, q)|^2,$$

where A is the number of windows in the kth block.

Provided the average noise value in all the windows is 0, $$\Phi_k(p, q) = |H(p, q)|^2 \sum_{i=1}^{A} |F_i(p, q)|^2 + \sum_{i=1}^{A} |N_i(p, q)|^2.$$

Considering that $$\overline{F}^2(p, q) = \sum_{i=1}^{A} |F_i(p, q)|^2$$

and $$\overline{N}^2(p, q) = \sum_{i=1}^{A} |N_i(p, q)|^2,$$

the equation may be rewritten as $$\Phi_k(p,q) = |H(p,q)|^2 \overline{F}^2(p,q) + \overline{N}^2(p,q).$$

This averaging significantly reduces the role of the noise and allows extracting information about $|H(p,q)|^2$.

Figure 5:
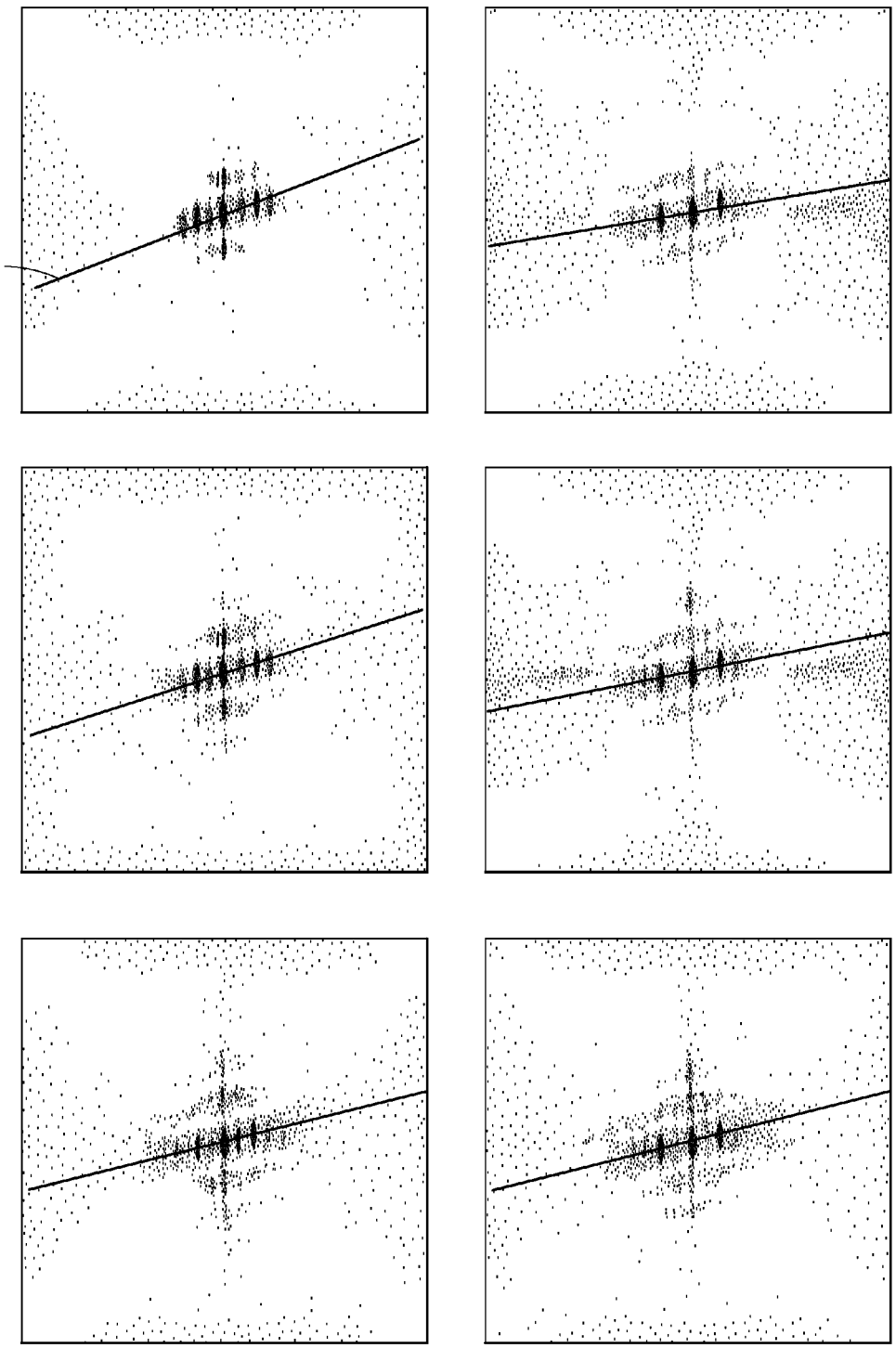
FIG. 5 shows examples of the functions $\Phi_k(p,q)$, with the noise deducted, with the blur direction specified, for all the blocks in FIG. 1, on a logarithmic scale.

FIG. 5 shows, in logarithmic scale, the functions $\Phi_k(p,q)$ for all the blocks of the image in FIG. 1, with the noise deducted and the blur direction 501 indicated.

Figure 6A:
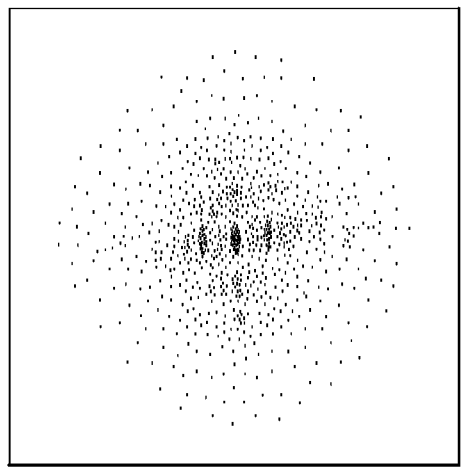
FIG. 6 shows an example of the function $\Phi(p,q)$, averaged over all the blocks of the motion-blurred image (FIG. 6A), with the noise deducted (FIG. 6B), on a logarithmic scale.
FIG. 6C shows the projections of the function $\Phi(p,q)$ on the diameter perpendicular to the direction of the blur and parallel to the blur line.

Segmenting the image into blocks, rather than summing up square of the modulus of the Fourier transform $|G_i(p,q)|^2$ over all the image windows, is performed in order to take into account the possible differences in the direction of the blur in different areas of the image. Once the direction of the blur is determined in each block, the functions $\Phi_k(p,q)$ are averaged over blocks, taking into account the directions of the blur in the blocks (FIG. 6A):

$$\Phi(p, q) = \sum_k \Phi_k^{(rotated)}(p, q).$$

Deducting the Noise (404)

Generally, one can identify and deduct the noise $\overline{N}(p,q)$ on the function $\Phi_k(p,q)$. Noise may be successfully modeled as a sum of the Gaussian and white noises:

$$\overline{N}^2(p,q) = N_G^2 e^{-(p^2+q^2)/p0^2} + N_W^2. \qquad (4)$$

To find the parameters of the noise, the radial profile of the function $\ln(\Phi_k(p,q))$ 701 is created, i.e. for each absolute value of the impulse $\sqrt{p^2+q^2}$, the minimum value $\ln(\Phi_k(p,q))$ is found. This profile is approximated by the logarithm of type (4) (702).

If the parameters of the noise are successfully found, the noise is deducted as follows:

$$\ln[\Phi_k^{(noiseless)}(p, q)] = \qquad (5)$$
$$\ln[\Phi_k(p, q)] - \ln[\overline{N}^2(p, q)] = \ln\left[1 + |H(p, q)|^2 \frac{\overline{F}^2(p, q)}{\overline{N}^2(p, q)}\right]$$

Determining the Direction of the Blur (405)

Figure 6B:
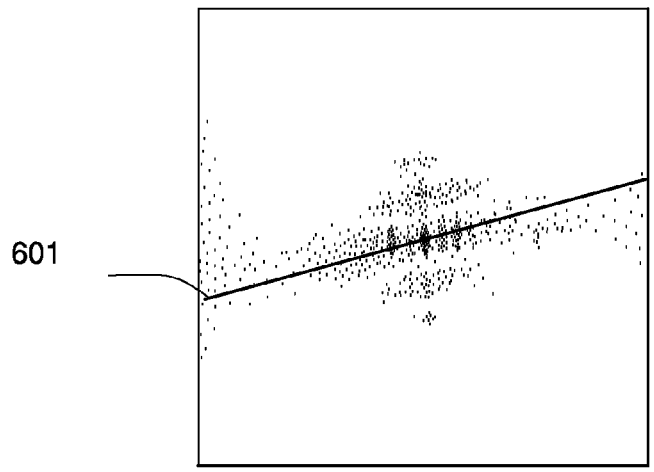
Figure 6C:
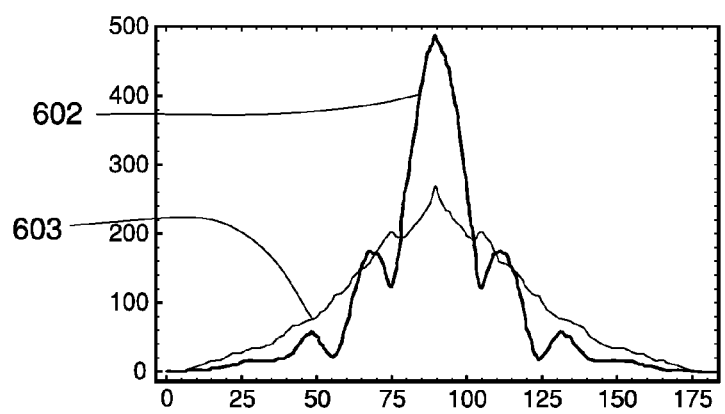
Figure 7:
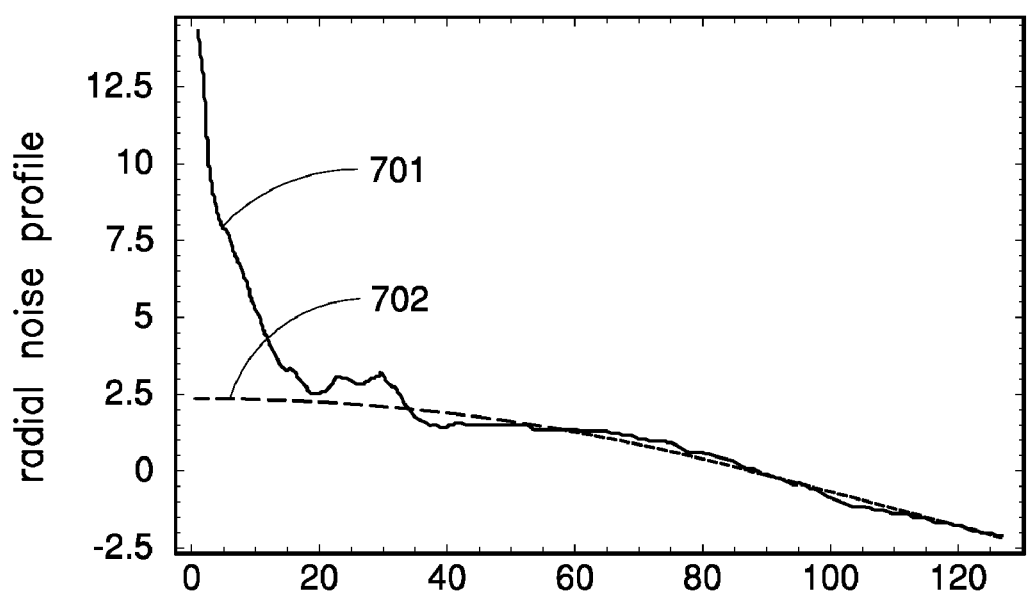
FIG. 7 shows the radial profile of the function $\ln(\Phi_k(p,q))$ and its approximation.

Based on the function $\Phi_k^{(noiseless)}(p,q)$, the direction of the blur is determined for the entire image 601. For this purpose, the function $\ln|\Phi_k^{(noiseless)}(p,q)|$, shown in FIG. 6B, is projected on the diameter of the circle in different directions. FIG. 6C shows two projections of this function: the projection 602 is made on the diameter perpendicular to the direction of the blur 601, and the projection 603 is made on the diameter parallel to the direction of the blur. For each direction, the width of the projection is calculated. The direction of the blur is determined by selecting the direction with the minimum ratio of the projection width to the width of the perpendicular projection. The direction is deemed to be reliably determined if the ratio of the widths is greater than a certain threshold, for example, a threshold of 1.5.

Finding the Absolute Value of the One-Dimensional OTF (302)

Once the direction of the blur 601 is determined in each block and the absolute OTF value has been averaged over the blocks, the absolute value of the one-dimensional OTF is determined. This is done similarly to (5) for the block-averaged function:

$$\ln[\Phi^{(noiseless)}(p, q)] = \ln\left[1 + |H(p, q)|^2 \frac{\overline{F}^2(p, q)}{\overline{N}^2(p, q)}\right] \qquad (6)$$

Then, along the line that goes through zero (p=0, q=0) in the determined direction, the function H(p,q) is constant and is 1, because PSF is normalized. Since on low frequencies the signal-to-noise ratio is significantly above 1, the section $\ln(\Phi^{(noiseless)}(p,q))$ that goes through zero in the direction of the blur will be close to $$\ln\left[\frac{\overline{F}^2(p, q)}{\overline{N}^2(p, q)}\right].$$

The signal-to-noise ratio can be successfully modeled by a Gauss function, and the logarithm can be modeled by a parabola. Therefore, at the first step, the section of the function $\ln(\Phi^{(noiseless)}(p,q))$ 1002 is created which goes along the direction of the blur 601. The section goes through zero and is approximated by the parabola 1003.

Figure 8A:
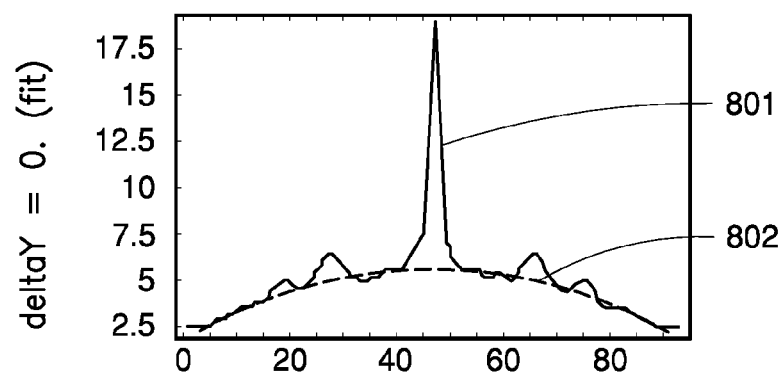
FIG. 8 shows the sections of the function $\ln(\Phi^{(noiseless)}(p,q))$ at distances 0, 5, and 10 (FIGS. 8A, 8B, 8C) from zero (p=0, q=0), parallel to the direction of the blur, and their approximation by the function $$\ln\left(1 + H_{1D}^2 \frac{F^2(p,q)}{N^2(p,q)}\right).$$
Figure 8B:
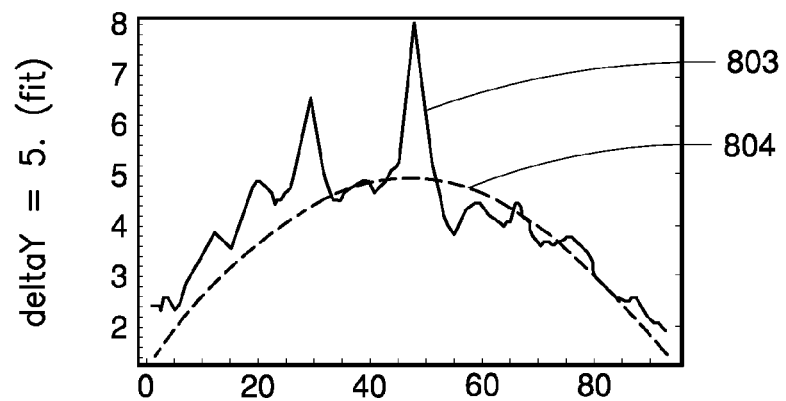
Figure 8C:
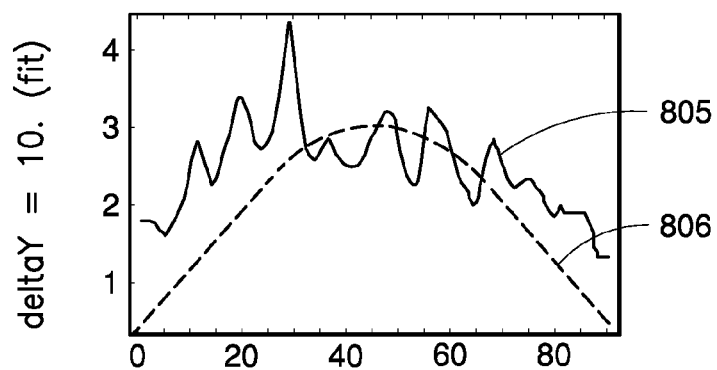
Figure 9:
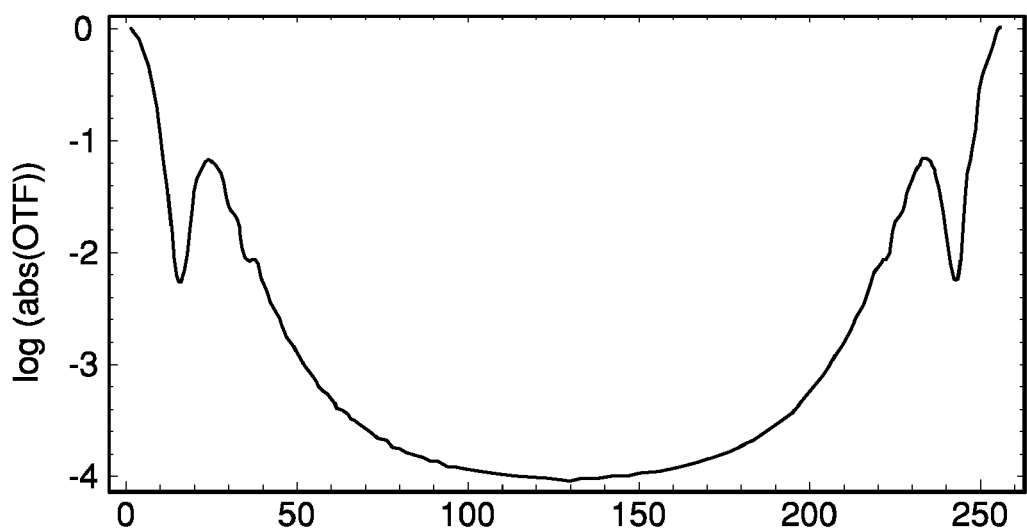
FIG. 9 shows the absolute value of OTF $H_{1D}$ which corresponds to the function $\Phi_k(p,q)$ in FIG. 6A in logarithmic scale.
Figure 10:
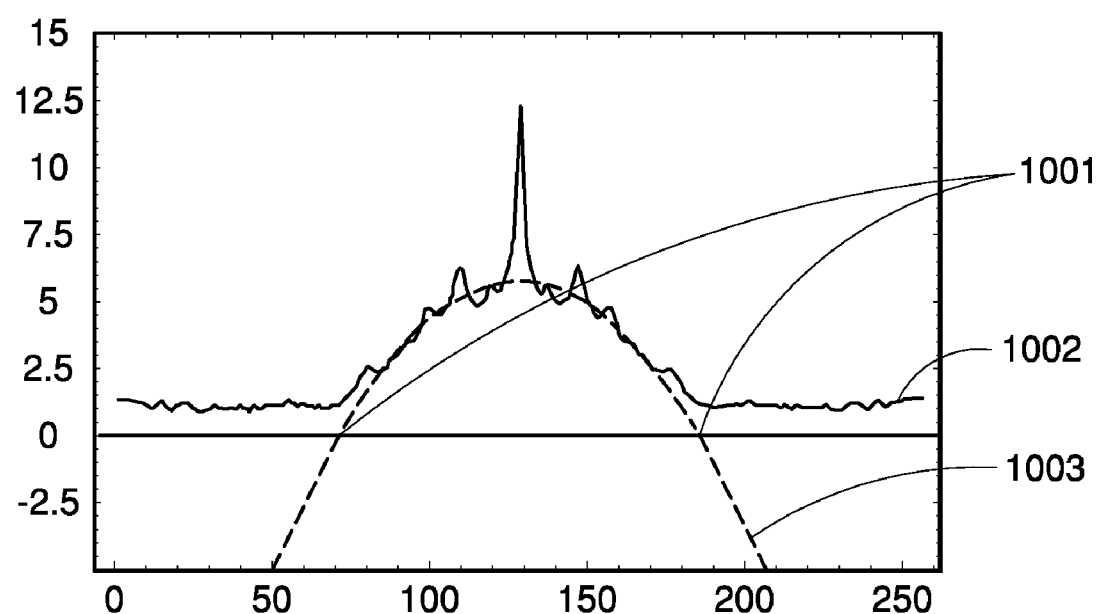
FIG. 10 shows the section of the function $\ln(\Phi^{(noiseless)}(p,q))$ which goes through zero (p=0, q=0), parallel to the direction of the blur, and its approximation by a parabola.

Next, it is assumed that the signal-to-noise value is determined only by the absolute value of the impulse $\sqrt{p^2+q^2}$. The one-dimensional OTF $H_{1D}$ can be restored inside the circle enclosed by the condition that requires that the parabola go through zero 1001, i.e. inside the circle in which the signal-to-noise ratio is close to or greater than 1. In this circle, the sections in the direction of the blur are created, which are located at different distances from zero and approximated by the function $$\ln\left(1 + H_{1D}^2 \frac{\overline{F}^2(p, q)}{\overline{N}^2(p, q)}\right),$$

where $$\frac{\overline{F}^2(p,q)}{\overline{N}^2(p,q)}$$

is determined by the found parabola 1003, and $H_{1D}^2$ is an approximation parameter. Thus, $H_{1D}^2$ is determined for each distance from zero. FIG. 8 shows the sections of the function $\ln(\Phi^{(noiseless)}(p,q))$ 801, 803, and 805, which are located at distances 0, 5, and 10 from zero, and their approximations 802, 804, and 806. Outside the circle, the OTF decrements gradually to a certain minimal value. The logarithm of the absolute value of the one-dimensional OTF is shown in FIG. 9.

Determining the Signal-to-Noise Ratio (303)

It is assumed that the signal-to-noise ratio $$\frac{\overline{F}^2(p,q)}{\overline{N}^2(p,q)}$$

depends only on the absolute value of the impulse $\sqrt{p^2+q^2}$. For low frequencies, the logarithm $$\ln\left[\frac{\overline{F}^2(p,q)}{\overline{N}^2(p,q)}\right]$$

of the signal-to-noise ratio is determined by the parabola that approximates the section of the function $\ln(\Phi^{(noiseless)}(p,q))$, which goes through zero in the direction of the blur. For higher frequencies, smoothed values of the same section are used. Additionally, a lower limit is introduced: the signal-to-noise ratio must be greater than 0.5.

Determining the Phase of the One-Dimensional OTF Based on its Absolute Value (304)

OTF is a complex function defined by an absolute value and phase. (302) describes how the absolute value of the OTF is determined. The phase has to be determined separately. In a certain class of functions, namely minimum-phase functions, the absolute value $\rho_w$ and the phase $\phi_w$ of their Fourier transform are linked by the Hilbert transform:

$$\varphi_w = \frac{2}{N}\sum_{w'=0}^{N-1}\ln(\rho_{w'}) \times \begin{cases} 0, & \text{if } (w-w') \text{ is even} \\ ctg\left((w-w')\frac{\pi}{N}\right), & \text{if } (w-w') \text{ is odd} \end{cases} \quad (7)$$

Here w,w'=0 . . . N−1. The minimum phase condition is a condition that requires that the function be invertible and that the function and the inverse function be causal functions. The phase of the one-dimensional OTF is determined by (7).

Selecting the Sign of the OTF Phase (305)

The phase of the OTF is determined based on the absolute value of the OTF using the formula (7), with a corresponding accuracy. In order to select the correct sign of the phase, both signs are used to restore the image in several windows which have the maximum gradient. Then the sign that produces the best result is selected. The best result is the one that has the smallest area of the restored segment filled with pixels with a high absolute value of the derivative in the direction of the blur, which means sharper boundaries on the image.

Restoring the Image (306)

In order to restore the image, the Wiener filter (3) is applied to each window. The blur direction of the image is defined as the blur direction of the block 501 to which it belongs. The pixels of the restored image are obtained by averaging over the pixels of the overlapping windows. The value of the window's function is used as the weight.

Figure 11:
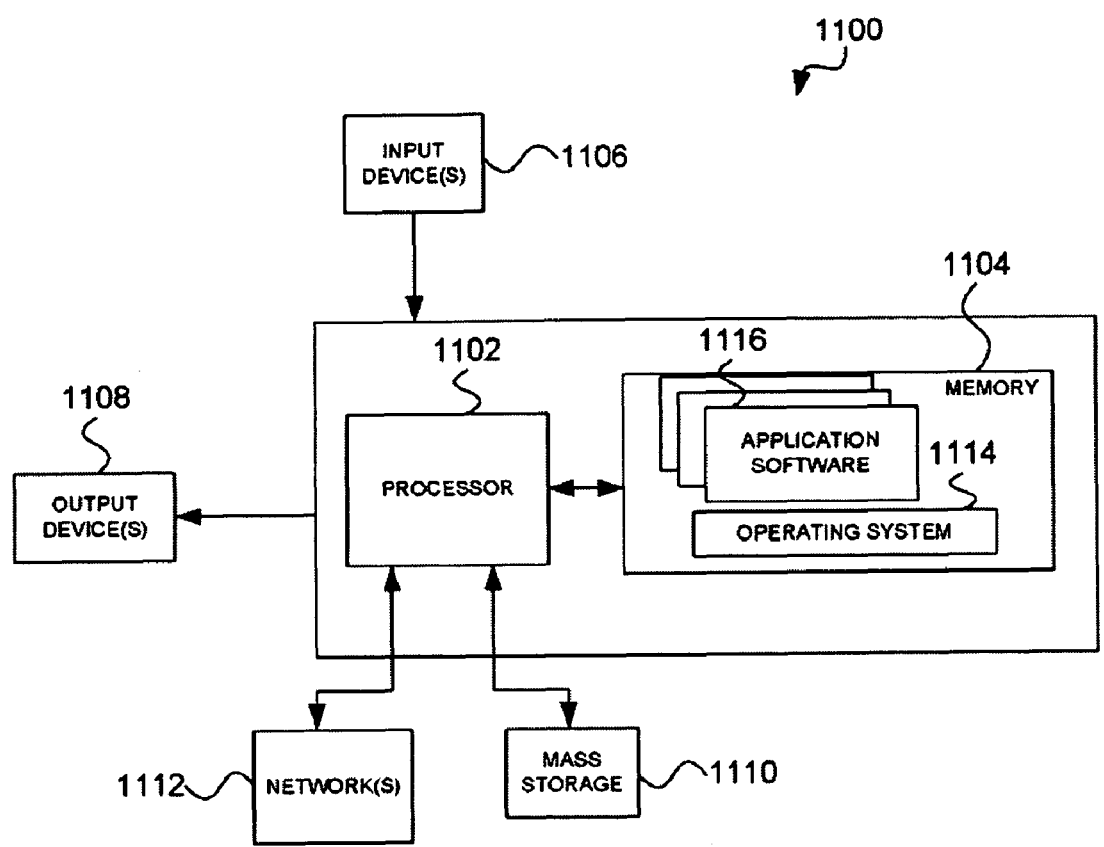
FIG. 11 shows a block diagram of a system for restoring motion-blurred images in accordance with an example embodiment.

FIG. 11 of the drawings shows an example of a system 1100. Depending on the use of the system 1100, it may be a system for restoring a motion-blurred image, optionally including OCR capabilities. The system 1100 may be operable to implement the method of FIG. 3. The system 1100 may include at least one processor 1102 coupled to a memory 1104. The processor 1102 may represent one or more processors (e.g., microprocessors), and the memory 1104 may represent random access memory (RAM) devices comprising a main storage of the system 1100, as well as any supplemental levels of memory e.g., cache memories, non-volatile or back-up memories (e.g. programmable or flash memories), read-only memories, etc. In addition, the memory 1104 may be considered to include memory storage physically located elsewhere in the system 1100, e.g. any cache memory in the processor 1102 as well as any storage capacity used as a virtual memory, e.g., as stored on a mass storage device 1110.

The system 1100 also typically receives a number of inputs and outputs for communicating information externally. For interface with a user or operator, the system 1100 may include one or more user input devices 1106 (e.g., a keyboard, a mouse, imaging device, etc.) and one or more output devices 1108 (e.g., a Liquid Crystal Display (LCD) panel, a sound playback device (speaker, etc)).

For additional storage, the system 1100 may also include one or more mass storage devices 1110, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 1100 may include an interface with one or more networks 1112 (e.g., a local area network (LAN), a wide area network (WAN), a wireless network, and/or the Internet among others) to permit the communication of information with other computers coupled to the networks. It should be appreciated that the system 1100 typically includes suitable analog and/or digital interfaces between the processor 1102 and each of the components 1104, 1106, 1108, and 1112 as is well known in the art.

The system 1100 operates under the control of an operating system 1114, and executes various computer software applications, components, programs, objects, modules, etc. to implement the techniques described above. Moreover, various applications, components, programs, objects, etc., collectively indicated by reference 1116 in FIG. 11, may also execute on one or more processors in another computer coupled to the system 1100 via a network 1112, e.g. in a distributed computing environment, whereby the processing required to implement the functions of a computer program may be allocated to multiple computers over a network. The application software 1116 may include a set of instructions which, when executed by the processor 1102, causes the system 1100 to implement the method of FIG. 3 and/or FIG. 4.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

We claim:

1. A device for correcting for motion blur in a motion-blurred image, the device comprising:

a processor;

a memory configured with instructions for:

determining parameters for a one-dimensional Optical Transfer Function (OTF) for the motion-blurred image in Fourier space by calculating a function $\Phi(p,q)$, wherein the function is based on the square of the modulus of the Fourier transform $|G(p,q)|^2$ of the motion-blurred image;

determining a signal-to-noise ratio for the motion-blurred image in the Fourier space;

segmenting the motion-blurred image into blocks, each block comprising a plurality of windows, each window comprising a plurality of picture elements, wherein calculating the function $\Phi(p,q)$ includes calculating $$\Phi_k(p, q) = \sum_{i=1}^{A} |G_i(p, q)|^2$$

for each block k, where A is the number of windows in the kth block; and correcting for motion blur based on the parameters.

2. The device of claim 1, wherein the memory is further configured with instructions for:

identifying and removing noise on the function $\Phi_k(p,q)$ to form a function $\Phi_k^{(noiseless)}(p,q)$.

3. The device of claim 1, wherein identifying the noise on the function $\Phi_k(p,q)$ is based on a radial profile of $\ln(\Phi_k(p,q))$.

4. The device of claim 3, wherein the memory is further configured with instructions for:

determining a direction of blur for each block.

5. The device of claim 4, wherein determining the direction of blur comprises projecting $\ln[\Phi_k^{(noiseless)}(p,q)]$ onto a diameter of a circle in a plurality directions, determining a width for the projection in each direction, determining a ratio of the widths in the different directions, and selecting the direction of blur as the direction with a minimum ratio of the widths.

6. The device of claim 5, wherein the ratio of the widths is required to be above a minimum threshold.

7. The device of claim 6, wherein calculating the function $\Phi(p,q)$ comprises averaging the functions $\Phi_k(p,q)$ over the blocks, taking into account the direction of blur.

8. The device of claim 7, wherein determining parameters for the one-dimensional Optical Transfer Function (OTF) comprises determining the absolute value of the one-dimensional OTF based on the function $\ln[\Phi_k^{(noiseless)}(p,q)]$.

9. The device of claim 8, wherein determining parameters for the one-dimensional Optical Transfer Function (OTF) comprises determining a phase of the one-dimensional OTF based on the absolute value.

10. The device of claim 9, wherein determining parameters for the one-dimensional Optical Transfer Function (OTF) comprises determining a sign for the phase of the one-dimensional OTF.

11. The device of claim 1, wherein each window is square and sufficiently large to include individual elements of the motion-blurred image in their entirety.

12. The device of claims 11, wherein for each window, components of each pixel are multiplied by a function that equals 1 at the center of the window and decreases to 0 at edges of the window.

* * * * *